United States Patent Office 3,359,015
Patented Dec. 19, 1967

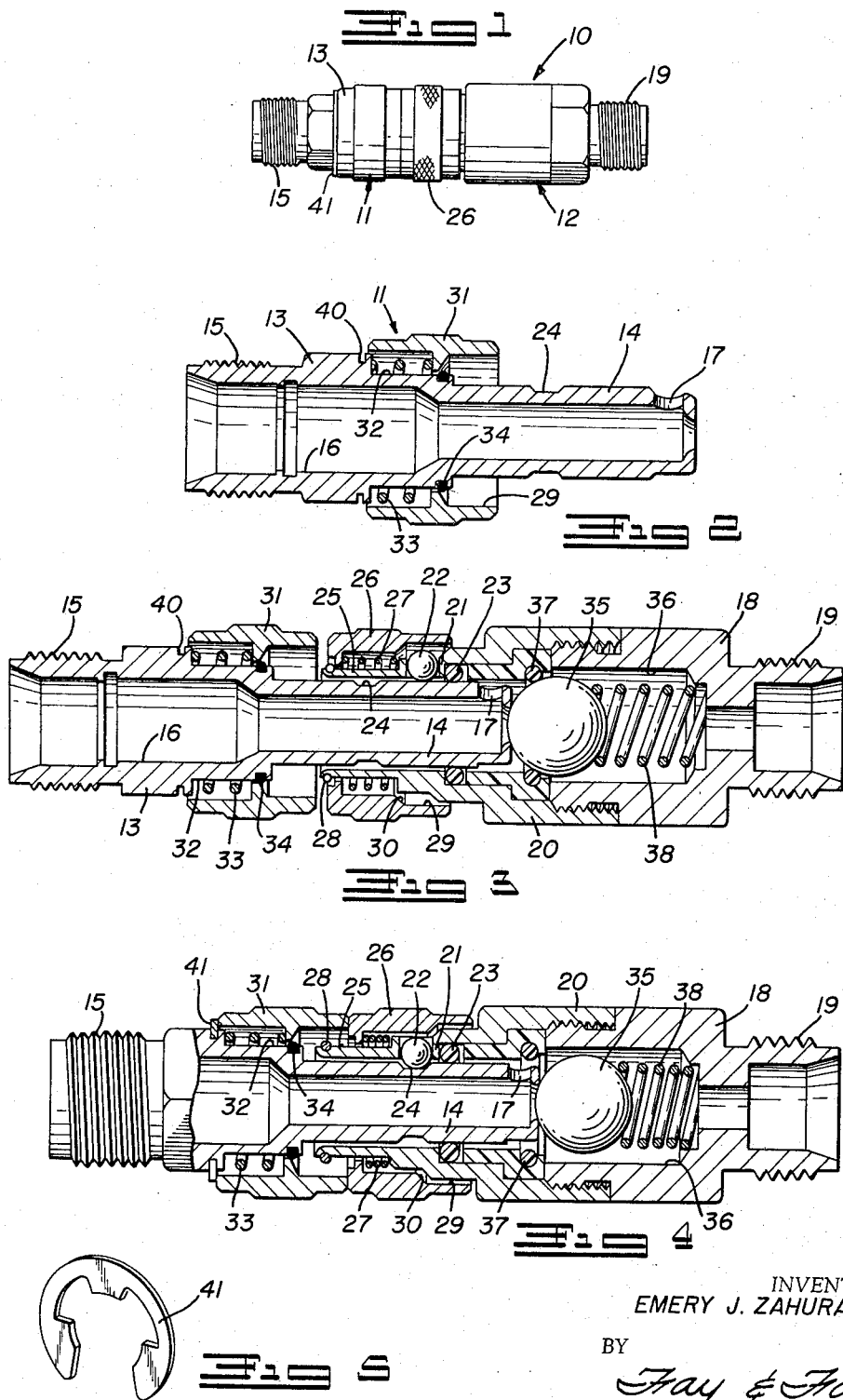

3,359,015
QUICK CONNECT TUBE COUPLING
Emery J. Zahuranec, Solon, Ohio, assignor to Crawford Fitting Company, Cleveland, Ohio, a corporation of Ohio
Filed June 14, 1965, Ser. No. 463,588
2 Claims. (Cl. 285—89)

ABSTRACT OF THE DISCLOSURE

A quick connect coupling with the male member including a circumferential groove immediately adjacent the inner end of the sleeve thereon and the groove being adapted to receive removably a lock ring which precludes inadvertent actuation of the coupling.

This invention relates to tube couplings and more particularly to a quick connect coupling with means thereon to prevent inadvertent disconnection of the coupling parts.

Quick connect couplings of various constructions have been employed in the tube fitting field for many years. Typically, the prior art construction has included separable male and female members with detent means carried by the female member and adapted to engage the male member when the male member is inserted in the female member. The operation of the detent means is ordinarily controlled by some form of a spring biased sleeve which may be operated against the bias of the spring to permit separation of the male and female members. Quick connect couplings of this type are generally used in an environment wherein it is contemplated that the fluid lines connected by the coupling may be disconnected periodically. During the periods when the couplings are connected, however, it is important that the coupling serve in a fluid-tight capacity to interconnect the fluid lines.

In the environment of a laboratory or a panelboard where personnel are frequently working around the fluid conduits and selectively connecting and interconnecting various ones of the conduits, it sometimes occurs that a quick connect coupling may be inadvertently separated by actuation of the control sleeve. The frequency with which the inadvertence occurs depends, to a large extent, on the ease with which the control sleeve may be actuated. Since quick connect couplings are composed of a plurality of interconnecting and movable parts, the normal manufacturing tolerances which are inevitably present in such construction have a decided role in determining the potential inadvertent disconnection of a given coupling. Moreover, the age of a coupling and the use to which the coupling has been put will have a direct bearing on the ease with which the control sleeve may be actuated and the effectiveness of the biasing means on the control sleeve to maintain the sleeve in a connected position. All of these factors contribute to a quick connect coupling which potentially may be inadvertently disconnected by a person brushing against the coupling or by an object striking the control sleeve of the coupling.

With these problems in mind, it is an object of this invention to provide an improved quick connect coupling.

More specifically, it is an object of this invention to provide a quick connect coupling which is operable in the usual manner, but which includes additional means to prevent the inadvertent disconnection of the coupling parts.

It is a further object of this invention to provide a quick connect coupling which may be employed to interconnect fluid lines in a separable manner, but which includes means whereby the fluid lines may be permanently interconnected.

It is another object of this invention to provide a quick connect coupling which has a safety feature preventing the inadvertent actuation of the coupling.

More specifically, the invention contemplates the provision of a quick connect coupling which may be used to separably interconnect a fluid line, but which includes means preventing the actuation of the control sleeve of the coupling until this means has been displaced permitting the actuation of the control sleeve.

Thus, the invention contemplates separable male and female members comprising a quick connect coupling, with each of the members being adapted to be secured to the end of a fluid line. Detent means are provided on the female member for cooperation with the male member when the male member is inserted in the female member thereby to interconnect the two members in a fluid conducting position. Control sleeve means are provided on the male member and are adapted to cooperate with the detent means in the connected position thereby to secure the male member in the female member. The control means includes a spring biased sleeve slidably mounted on the male member. To disconnect the members, it is necessary to retract the sleeve against the bias of the spring to permit the detent means to be released from engagement with the male member. It is contemplated by this invention that means may be provided on the male member adjacent the sleeve which means normally prevents the retraction of the sleeve against the bias of the spring. This means may take the form of a snap ring which is disposed in a groove formed in the male member adjacent the end of the sleeve and adapted to engage the end of the sleeve so that as the sleeve is moved against the bias of the spring, the snap ring prevents the rearward movement of the sleeve. It will be readily apparent that this arrangement prevents the retraction of the sleeve against the spring bias and thereby precludes the release of the detent means from engagement with the male member and, in turn, prevents the separation of the male and female members. Removal of the snap ring permits separation of the members in the ordinary manner.

Other objects and features will become more apparent upon a complete reading of the following description which sets forth in detail but one approved means of carrying out the invention. Such disclosed means is not meant to be limiting inasmuch as it constitutes but one of the various ways in which the principles of the invention may be applied.

In the drawings wherein like reference numerals indicate like parts in the various views:

FIG. 1 is a plan view of the quick connect coupling comprising the invention;

FIG. 2 is a longitudinal cross-sectional view of the male member of the quick connect coupling of FIG. 1;

FIG. 3 is a longitudinal cross-sectional view of the tube coupling of FIG. 1, with the male member inserted in the female member, but the members not being connected;

FIG. 4 is a longitudinal cross-sectional view of the tube coupling of FIG. 1 similar to the view of FIG. 3, with the members in connected position and the control sleeve locked in position;

FIG. 5 is a perspective view illustrating a typical type of snap ring which may be employed as the locking device.

Referring to the drawings, and particularly FIG. 1, there is indicated generally by the reference numeral 10 a quick connect coupling which comprises the instant invention. This coupling includes a male member 11 and a female member 12. The male member comprises a body portion 13 having an elongated tubular portion 14 projecting from one end thereof. The end of the body portion 13 opposite to the elongated tubular portion includes threads 15 adapted for engagement with a fluid line. A fluid passage 16 is provided in the interior of the body 13 and extends through the elongated tubular portion 14. Radial openings 17 are formed in the end of the tubular portion 14.

The female member, likewise, comprises a body portion 18 and has means at one end thereof such as threads 19 for interconnection with a fluid conduit. The female body member 18 includes a longitudinally extending extension 20 in which there is provided a plurality of frusto-conical radial bores or openings 21 for the reception of ball detents 22. The longitudinal extension 20 provides a socket in which the tubular extension 14 is adapted to be received with a fluid packing in the form of an O-ring seal 23 serving to engage the exterior surface of the extension 14. The balls 22 are adapted to be received in a circumferential groove 24 provided in the periphery of the tubular extension 14.

The tubular extension 20 includes a reduced cylindrical surface 25 over which there is slidably received a sleeve 26. The interior of the sleeve, together with the surface 25, defines a chamber for the reception of a helical spring 27 which reacts against the sleeve to bias the sleeve to a position in engagement with a snap ring 28 on the end of the tubular extension 20. In this position, the detent balls 22 are received in a counterbored portion 29 of the sleeve 26 and are radially spaced outwardly from the longitudinal axis of the socket thereby permitting the insertion of the male member. A cam surface 30 is provided at the inner end of the counterbore 29 and defines a surface which, when the sleeve 26 is retracted against the bias of the spring 27, serves to cam the ball detents 22 radially inwardly. A sleeve 31 similar to sleeve 26 is provided on a reduced cylindrical portion 32 which is intermediate the male body 13 and the tubular extension 14. The interior of the sleeve defines, with the surface 32, a chamber in which there is disposed a spring 33 which biases the sleeve to an extended position in abutment with a snap ring 34 carried on the male member. The strength of the spring 33 is greater than the strength of the spring 27 for a purpose which will appear hereinafter.

The female member further includes a valving member in the form of a ball 35 which is received in a central cavity 36 in the interior of the female body 18. This ball engages a sealing seat 37 and is biased by a spring 38 toward the sealing position. It will be apparent from an inspection of FIG. 4 that insertion of the male member in the socket of the female member causes the end of the tubular extension 14 to displace the ball 35 from its engagement with the sealing seat 37 and thereby permit the flow of fluid through the male member and out the female member.

To interconnect the male and female members, the parts of the two members will be in the relative positions illustrated in FIG. 3. The male member is then inserted in the socket of the female member and, as insertion of the male member is accomplished, the end of the sleeve 31 abuts the opposing end of the sleeve 26. Since the spring 33 is stronger than the spring 27, the sleeve 31 tends to displace the sleeve 26 against the bias of the spring 27. As the sleeve 26 is displaced longitudinally of the female member, the cam surface 31 engages the ball detents 22 and causes them to be displaced radially inwardly. As the balls are displaced radially inwardly, the male extension 14 assumes a position wherein the groove 24 may receive the ball detents 22. Simultaneously, the ball 35 is displaced by the end of the tubular extension 14 and thereby permits the flow of fluid through the female member. The superior strength of the spring 33 retains the sleeve 26 in a position wherein the spring 27 is compressed and the detent balls 22 are engaged against the interior surface of the sleeve 26 and are thereby prevented from moving radially outwardly. In effect, the detent balls 22 thus interconnect the male and female members and prevent the withdrawal of the male member from the female member.

To disconnect the male and female members, it is necessary to retract the sleeve 31 against the spring 33 and thereby permit the spring 27 to bias the sleeve 26 to a position wherein the detent balls 22 may move radially outwardly and permit retraction of the male member. The retraction of the sleeve 26 may be accomplished by grasping the sleeve and forcing the sleeve against the sleeve 31 so that the spring 33 is compressed and the spring 27 is permitted to return the sleeve to a position wherein the detent balls 22 may move radially outwardly into the counterbored portion 29 of the sleeve 26.

As pointed out above, it is ofttimes desirable to use a quick connect coupling in an environment wherein the coupling, once installed in the fluid line, is not frequently disconnected. Moreover, it is extremely important that a coupling of the type herein disclosed not be inadvertently disconnected when there is fluid pressure in the system. To prevent such an occurrence, there is included in the body 13 a circumferential groove 40. This groove is formed in the body immediately adjacent the rearward end of the sleeve 31 as is best viewed in FIG. 3. Adapted to be received in the groove 40 is a snap ring which may take the form of the ring 41 illustrated in FIG. 5. The dimensions of the groove 40 and the ring 41 should be such that the ring 41 snugly fits in the groove but is readily removable from the groove whenever desired. With the ring 41 installed in the groove 40, as shown in FIG. 4, it is apparent that the sleeve 31 is prevented from movement in a direction which would compress the spring 33. Thus, the depth of the groove 40 is such that the ring 41 protrudes radially outwardly of the groove to a position wherein it interferes with any potential longitudinal displacement of the sleeve 31 and, in effect, locks the sleeve 31 between the ring 34 and the ring 41. When it is desired to uncouple the fluid lines, the operator needs only slip the ring 41 from the groove 40 and thereby clear the path for retraction of the sleeve 31.

The precise location of the groove 40 in the body 13 may be varied. Thus, if the particular design of the ring requires a tool for removal it may be desirable to place the groove at a small distance from the end of the sleeve 31. If the ring is to be removed by hand, it may be necessary to increase the spacing slightly. In any event, the groove must be located at a distance from the sleeve 31 less than the distance necessary for the sleeve 26 to move in releasing the ball detents 22. In addition the groove should have a depth in excess of the usual recommended depth so that the ring may be removed with greater facility.

By the employment of the ring 41 in combination with the quick connect coupling, it is readily apparent that a coupling, once installed in a fluid line, may be locked in position so that any inadvertent disconnection of the members is avoided. However, the simplicity of the device and the ease with which it is contemplated that the ring may be removed from the groove does not detract from the quick disconnect features of the coupling. Moreover, it is apparent that the ring 41 may be assembled in the groove 40 prior to the connection of the male and female members without detracting from the quick connection of the two members.

Although the concept has been illustrated in connection with a specific type of coupling, it is not contemplated that this type of coupling is controlling; rather, changes in the specific design of the coupling is believed to come within the scope of the invention. Additional modifications and changes will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment or the terminology employed in describing it is to be limiting; but rather, it is my desire to be restricted only by the scope of the appended claims.

I claim:
1. A coupling comprising:
   a female socket member having an open end;
   detent means carried by said socket member and being movable between a position extending into the interior of said socket member and a position withdrawn from the interior of said socket member;
   a first sleeve slidably carried by said socket member having detent confining and detent releasing positions;
   a first spring interposed between said socket member and sleeve biasing said sleeve towards a detent releasing position;
   a male member having a forward end receivable in said open end of said female socket member and including means adapted to receive said detent means;
   a second sleeve slidably carried by said male member and movable between an extended position and a retracted position;
   said second sleeve including a surface adapted to abut said first sleeve;
   a second spring of greater strength than said first spring interposed between said male member and said second sleeve and biasing said second sleeve to an extended position whereby said second sleeve is in engagement with said first sleeve and holds said first sleeve in said detent confining position when said male member is received in said female socket member and said detent receiving means on said male member receives said detents;
   releasable lock means on said male member spaced from the rear end of said second sleeve when said second sleeve is in engagement with said first sleeve a distance less than the distance between said detent confining and detent releasing positions of said first sleeve;
   said lock means being in the path of travel of said second sleeve whereby retraction of said second sleeve against the bias of said second spring sufficient to uncouple said male member from said female socket member is prevented;
   said lock means being carried by said male member such that said lock means may be readily detached from said male member whereby said second sleeve may be retracted against the bias of said second spring;
   said lock means includes a groove formed in said male member and further includes a snap ring received in said groove;
   said snap ring being resilient and generally U-shaped with an outer diameter greater than the inner diameter of said second sleeve;
   said snap ring having terminal ends which are spaced apart a distance less than the diameter of said groove such that upon insertion and removal of said snap ring from said groove said terminal ends must resiliently spring apart;
   the dimensional interrelationship of said ring and groove retaining said ring in said groove and also permitting the ready removal of said ring from said groove.

2. The coupling of claim 1 wherein said groove is positioned immediately adjacent the rear end of said second sleeve in the extended position thereof.

References Cited

UNITED STATES PATENTS

| | | | |
|---|---|---|---|
| 2,736,578 | 2/1956 | Rafferty | 285—91 |
| 2,755,698 | 7/1956 | Wurzel | 85—8.8 |
| 2,797,110 | 6/1957 | Covington | 285—277 X |
| 2,985,425 | 5/1961 | Tang | 285—92 |
| 3,079,178 | 2/1963 | Simpkins | 285—91 X |
| 3,097,866 | 7/1963 | Iversen | 285—91 X |
| 3,174,508 | 3/1965 | Zahurance | 285—277 X |
| 3,222,091 | 12/1965 | Marshall | 285—321 X |

FOREIGN PATENTS 576,437  4/1946  Great Britain.

CARL W. TOMLIN, *Primary Examiner.*

D. W. AROLA, *Assistant Examiner.*